US006855091B1

(12) United States Patent
Holmes

(10) Patent No.: US 6,855,091 B1
(45) Date of Patent: Feb. 15, 2005

(54) SYSTEM FOR CONTROLLING AN AUTOMATIC TRANSMISSION THROTTLE VALVE AND METHOD OF USE

(76) Inventor: Stephen G. Holmes, 13176 Red Cedar St., Victorville, CA (US) 92392

( * ) Notice: Subject to any disclaimer, the term of this patent is extended or adjusted under 35 U.S.C. 154(b) by 0 days.

(21) Appl. No.: 10/434,120

(22) Filed: May 9, 2003

(51) Int. Cl.[7] ................................................ F16H 59/30

(52) U.S. Cl. ........................ 477/121; 123/342; 123/396; 123/400; 123/403

(58) Field of Search .......................... 477/121; 123/342, 123/396, 400, 403

(56) References Cited

U.S. PATENT DOCUMENTS 4,411,845 A * 10/1983 Tanahashi et al. ............ 261/65
4,631,983 A * 12/1986 Morisawa et al. .......... 477/156
5,078,111 A * 1/1992 McCann ..................... 123/400
RE34,138 E * 12/1992 Flaig et al. ................. 123/400
5,542,313 A * 8/1996 McCarthy .................... 74/513
5,964,203 A * 10/1999 Sato et al. .................. 123/396
6,575,875 B2 * 6/2003 Holmes ...................... 477/121
2003/0196638 A1 * 10/2003 Matsuda et al. ............ 123/342

FOREIGN PATENT DOCUMENTS

JP 02238138 A * 9/1990 ............. F02D/9/02
JP 02308932 A * 12/1990 ........... F02D/11/04
JP 03225036 A * 10/1991 ............. F02D/9/02
JP 04005439 A * 1/1992 ............. F02D/9/02

* cited by examiner

*Primary Examiner*—Saul Rodriguez
*Assistant Examiner*—David D. Le
(74) *Attorney, Agent, or Firm*—Timothy Thut Tyson; Ted Masters; Freilich, Hornbaker & Rosen

(57) ABSTRACT

A system for controlling a transmission throttle valve allows the transmission response to be quickly adjusted. The system includes an adapter assembly which is mounted on the rotatable throttle member of a fuel management device. A cam assembly is selectively positionable on the adapter assembly so as to adjust the rate of throttle valve cable pull. The cam assembly has guide pins which move within guide slots on the adapter assembly. The cam assembly also has an adjustment slot which receives an adjustment screw connected to the adapter assembly. The cam assembly is positioned on the adapter assembly so that the adjustment screw occupies a desired location along the adjustment slot, and then the adjustment screw is tightened to lock the cam assembly in place.

15 Claims, 13 Drawing Sheets

SYSTEM FOR CONTROLLING AN AUTOMATIC TRANSMISSION THROTTLE VALVE AND METHOD OF USE

TECHNICAL FIELD

The present invention pertains generally to automobiles having automatic transmissions, and particularly to a system for selectively controlling the actuation rate of the automatic transmission throttle valve.

BACKGROUND OF THE INVENTION

The throttle valve, which is slidably movable in a bore, regulates the flow of transmission oil through the transmission's valve body. A linkage couples the position of the accelerator pedal to the throttle valve, and causes the throttle valve to move between an idle or low throttle position and a full or wide open throttle position. Throttle valve controlled transmissions utilize a cable running from the vehicle's fuel management system whether a fuel injector or carburetor to the transmission's valve body. The cable linkage between a modern fuel injector/carburetor system provides a signal method for proper transmission function. The cable connection is commonly known as the throttle valve (TV) cable. The TV cable connects the throttle mechanism to the transmission hydraulic control valve. The throttle valve reciprocates in a common bore in the transmission valve body, and is typically composed of a plunger, spring, and throttle valve. The positioned relationship of these components determines how the transmission will operate.

The TV cable is used to connect the carburetor linkage at one end, to a swinging lever at the other end. The swinging lever moves the throttle valve. Any movements of the carburetor linkage, during normal driving, results in a corresponding movement of the TV cable. Carburetors have a range of movement from idle to wide open throttle (W.O.T.). As normal carburetor linkage movement pulls the TV cable, the swinging lever rotates thereby pushing the throttle valve plunger down its bore. This plunger has a designed operating range from its engineered starting point to a fully inwardly depressed position, wherein the range of motion is specific to a particular make and model. Even slight movement of the throttle valve linkage results in a corresponding movement of the throttle valve. As the throttle valve moves, it will adjust the shift timing, feel, and firmness of the transmission.

For the throttle valve system to function properly, actuation of the throttle valve must be proper for the particular vehicle. Just because the plunger (and therefore the TV) is mechanically made to move through its engineered spectrum of movement, does not mean the transmission will perform in the desired manner. The rate of movement at any given point can be altered by the dynamics of the carburetor linkage, and can dramatically affect transmission performance characteristics. When new cars are designed, the correct linkage relationship is established for each particular vehicle. This is done to satisfy the different transmission operating responses needed for the different types of vehicles. For example, a luxury car's TV system is not designed the same way as a performance car's TV system, nor as a pickup truck's TV system.

Mechanisms for controlling transmission throttle valves are well known in the art. For example, U.S. Pat. No. 4,631,983 shows a lever mechanism for a cable linkage including a control lever mounted on a rotary shaft for rotation therewith, a base plate mounted on the rotary shaft and fixed to the control lever for rotation therewith, and a lever plate adjustably assembled with the base plate and connected at one side of its outer peripheral portion to one end of the cable linkage. The lever plate is provided at its outer peripheral portion with a semicircular guide surface having a center located substantially at a rotation fulcrum of the lever plate. The cable linkage is supported on the semicircular guide surface of the lever plate. And the lever plate is displaceable on the base plate. During the assembly process, the distance between the semicircular guide surface and the rotation fulcrum is adjustable. U.S. Pat. No. 4,711,140 illustrates an improved throttle valve regulating system for automatic transmissions for motor vehicles. The throttle valve reciprocates in a bore as a result of the action of a plunger and a throttle valve spring to control the flow and pressure of transmission fluid or oil to effect gear shifting. A rigid spacing element of predetermined length received within the throttle valve spring is provided for urging the valve towards a full throttle position in the event that the valve sticks in the bore in a lower throttle position. The system further includes a high rate spring located in the full throttle position in the bore to prevent sticking of the valve in that position, and a low rate spring similarly positioned in the bore to counteract the force of the throttle valve spring for returning the throttle valve to a low throttle or zero position. The reciprocating throttle valve includes at least one land or circumferential flange having sharpened edges for shearing large particles or other impurities introduced into the bore with the transmission fluid which might otherwise become wedged between the valve and the bore and cause sticking of the valve in a fixed position in the bore.

U.S. Pat. No. 5,046,380 defines a throttle valve operating cam of an automatic transmission and an output control member of an automotive engine that are interconnected so as to cooperate with each other by a cable consisting of an outer tube and an inner cable. The inner cable is connected to the throttle valve operating cam and the output control member. One end of the outer tube is connected first to the automatic transmission. The other end of the outer tube is regulated in position relative to a cable fitting member secured to the automotive engine and then fixed to the cable fitting member secured to the automotive engine.

U.S. Pat. No. 5,727,425 comprises a method for adjusting the throttle valve cable in an automatic transmission. In a motor vehicle automatic transmission, for example a GENERAL MOTORS THM 700-R4 automatic transmission, the TV cable forms part of the mechanical link between the throttle pedal, the throttle valve linkage on a fuel delivery system (e.g., a carburetor or electronic fuel injector), and the throttle valve. The TV cable is adjusted using a sleeve and spring installed at the distal end of the TV cable between the cable end clamp and a teardrop shaped cable end fitting on the TV cable. The spring opposes the movement of the cable end fitting toward the distal end of the TV cable so that the cable end fitting is at its maximum distal position only at fully open throttle. This gives the vehicle operator the shift feel of a shorter TV cable at most throttle openings. The sleeve and spring are installed only on TV cables in automatic transmissions that do not have TV cable end fittings permanently attached to a throttle cam.

Providing a system which pulls the TV cable the correct distance while the carburetor linkage rotates from engine idle to wide open throttle is a relatively simple engineering exercise. However, just because the TV cable provides the correct cable pull distance as the linkage rotates from idle to wide open throttle does not automatically mean the transmission will behave correctly or appropriately. For example, because a transmission performs a second gear to first gear downshift doesn't mean it will do so at the appropriate time or with the correct firmness. The real issue is "behavior". To further exacerbate the situation, each individual driver defines what he or she believes is proper and correct behavior. Vehicles receiving these transmissions can vary tremendously from one another. Many of these differences can have an effect on the behavior of a transmission. A few factors which effect transmission performance are (1) more or less powerful engines, (2) vehicles of different weights, and (3) tires sizes and rear end ratios.

In view of the above, a method is needed for providing the required TV cable pull distance and allowing adjustment of the rate of cable pull. The present invention accomplishes this by always providing the correct cable pull distance, and by also allowing the installer to quickly adjust the rate of TV cable pull per degree of carburetor linkage rotation.

SUMMARY OF THE INVENTION

The present invention is directed to a system and method for controlling the throttle valve of automatic transmissions, and more particularly to a system and method which permits selective adjustment, or "Ming", of the rate at which the throttle valve is activated to adjust shift timing, firmness, and feel. This allows the installation of a modern throttle valve controlled automatic transmission into a vehicle for which it was not designed. Specifically, the linkage on older carburetors was never designed to provide the proper signal to newer throttle valve transmissions. The present invention provides a means of insuring not only the correct cable pull distance, but also of adjusting the characteristics of transmission operation. The present invention offers a user the ability to accomplish both a correct cable pull distance which is a requirement fixed by the travel of the throttle valve, while concurrently offering different cable pull rates to "tune" the transmission response to a desired shift timing, firmness, and feel.

The present invention allows the throttle valve cable pull characteristics to be altered using a uniquely designed cam. The cam is attached to the carburetor or fuel injection system's rotatable throttle linkage via a specially designed adapter assembly, and is also attached to the throttle valve cable. The position of the cam with respect to the linkage may be quickly and easily changed, thereby changing the rate of throttle valve cable pull, and therefore the behavior of the transmission.

In accordance with a preferred embodiment of the invention, a system for controlling a transmission throttle valve in a vehicle having a fuel management device which includes a rotatable throttle member having an idle state and a wide open throttle state, the transmission throttle valve connected to a throttle valve cable, said system comprising:

- a cam assembly attachable to the rotatable throttle member;
- the transmission throttle valve cable connectable to the cam assembly, wherein when the rotatable throttle member is rotated from the idle state to the wide open throttle state, the cam assembly pulls the transmission throttle valve cable a fixed distance; and,
- the cam assembly selectively positionable on the rotatable throttle member, wherein the position of the cam assembly determines the rate at which the throttle valve cable is pulled.

In accordance with an aspect of the invention, the cam assembly pulls the throttle valve cable the fixed distance for any selected position of the cam assembly with respect the rotatable throttle member.

In accordance with another aspect of the invention, the system further includes:

- an adapter assembly attachable to the rotatable throttle member;
- the adapter assembly including at least one guide slot;
- a cam assembly having at least one guide pin, a throttle valve cable guide, and a holder for holding the throttle valve cable;
- a retaining mechanism for selectively locking the adapter assembly and the cam assembly in fixed relationship;
- wherein the cam assembly may be placed in contact with the adapter assembly so that the at least one guide pin is received by the at least one guide slot; and,
- wherein the cam assembly may be moved so that the at least one guide pin assumes a desired position along the at least one guide slot, and the cam assembly locked in the desired position with the retaining mechanism.

In accordance with another aspect of the invention, the retaining mechanism includes an adjustment screw which rides along an adjustment slot in the cam assembly. The desired transmission response is chosen by positioning the cam assembly so that the adjustment screw occupies a desired location along the adjustment slot, and then tightening the adjustment screw to lock the cam assembly to the adapter assembly.

In accordance with another aspect of the invention, the adapter assembly includes two guide slots and the cam assembly includes two corresponding guide pins.

Other features and advantages of the present invention will become apparent from the following detailed description, taken in conjunction with the accompanying drawings, which illustrate, by way of example, the principles of the invention.

DETAILED DESCRIPTION OF THE INVENTION

Figure 1:
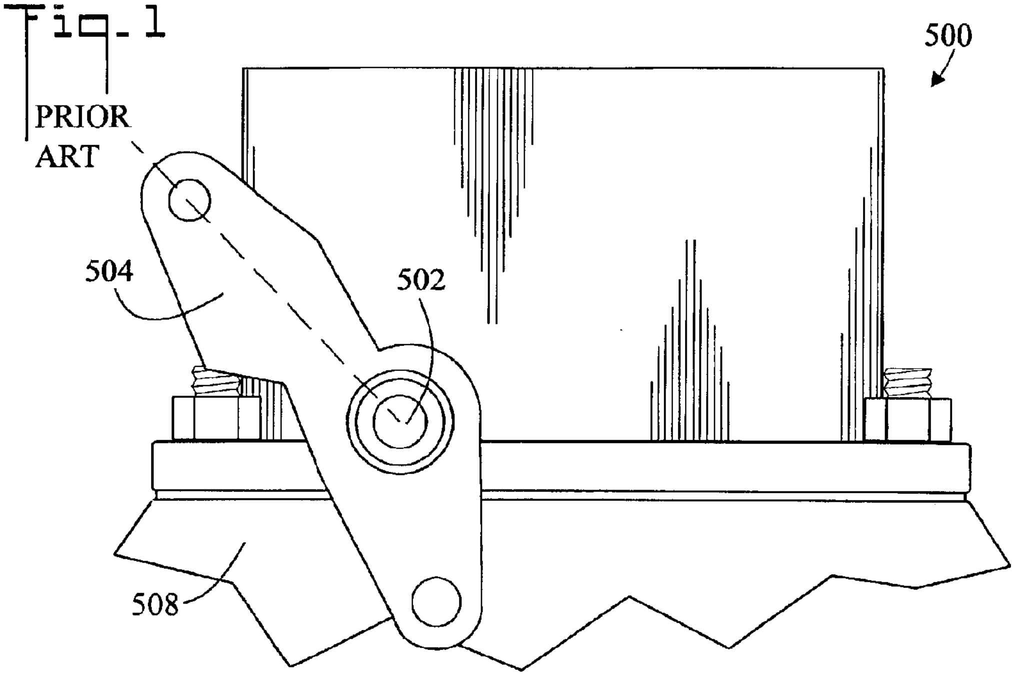
Fig-1 PRIOR ART
FIG. 1 is a side elevation view of a prior art fuel management device in an idle state.

FIG. 1 illustrates a side elevation view of a prior art fuel management device, generally designated as 500, in an idle state. The fuel management device 500 shown is a carburetor. The fuel management device 500 could also be a fuel injection system. Fuel management device 500 includes a rotatable throttle member. In the shown embodiment the rotatable throttle member is a throttle linkage member 504 which is connected to and rotates throttle shaft 502. A transmission throttle valve (not shown) is connected to fuel management device 500 by a throttle valve cable 506 (refer to FIG. 24).

Fuel management device 500 is mounted on an intake manifold 508 of a vehicle. In a typical embodiment, fuel management device 500 includes two butterfly valves which control the intake of air to the engine of the vehicle. The butterfly valves are connected to a throttle shaft 502. In the shown idle or low throttle position state, butterfly valves are oriented so as to block air from entering the air intake of the engine. When throttle linkage member 504 is rotated by an accelerator pedal linkage (not shown), throttle shaft 502 rotates and thereby rotates the butterfly valves increasing the intake of air to the engine.

Figure 2:
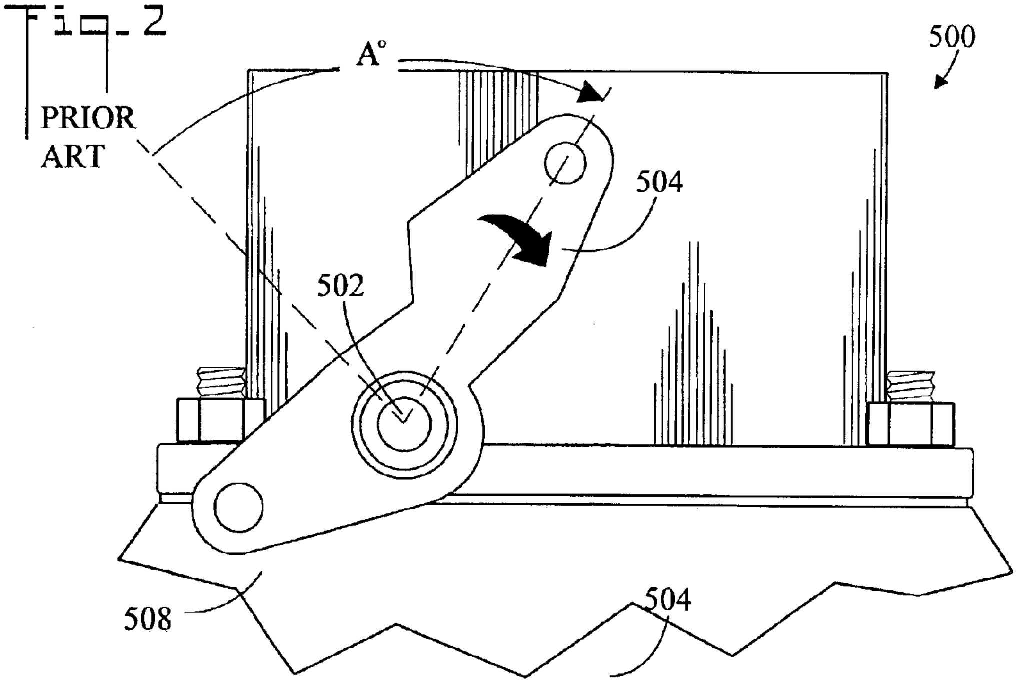
Fig-2 PRIOR ART
FIG. 2 is a side elevation view of the prior art fuel management device in a wide open throttle state.

FIG. 2 illustrates a side elevation view of the prior art fuel management device 500 in a wide open throttle state. Throttle linkage member 504 has been rotated through angle A causing throttle shaft 502 to rotate and open the butterfly valves increasing the intake of air to the engine. In the shown embodiment, the rotation angle A from idle to wide open throttle is 75.18°. This angular rotation applies to the "Pro-Flo 3500" aftermarket fuel injection system throttle body linkage available from Edelbrock Corporation of Torrance, Calif., and is used in the description of the present invention. However, it may be appreciated that other fuel management devices 500 will have a different angle A of rotation from idle to wide open throttle, yet the principles of the present invention disclosed herein may also be applied to these devices.

Figure 3:
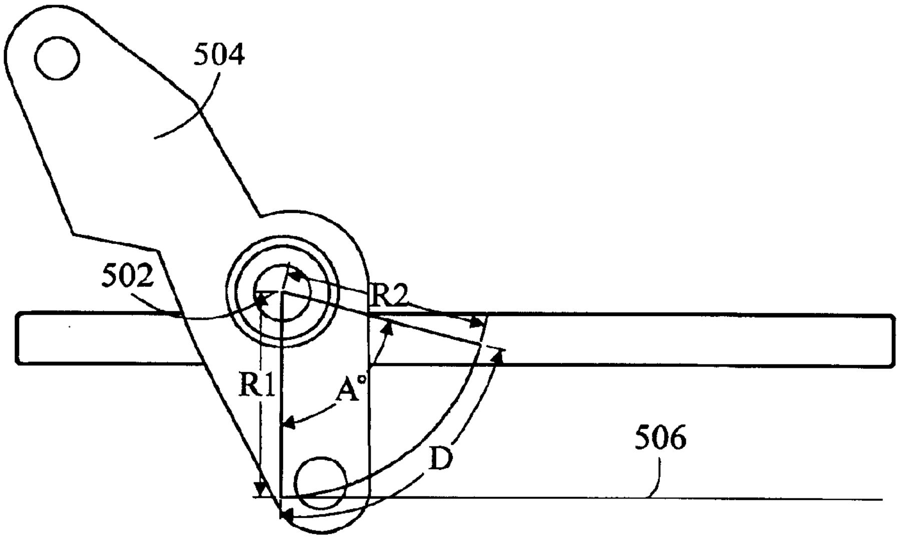
Fig. 3 PRIOR ART
FIG. 3 is a side elevation view of a throttle linkage member in an idle state showing a nominal arc of cam pull for a throttle valve cable.

FIG. 3 is a side elevation view of throttle linkage member 504 in an idle state. The throttle valve cable 506 is connected to the throttle valve of an automatic transmission. For the purposes of this illustration, the throttle valve requirements of a Th-700R4 transmission available from General Motors Corporation of Detroit, Mich., are used. As with the fuel management device 500, it may be appreciated that other transmissions will have different requirements, to which the principles of the present invention may be applied. The throttle valve cable 506 used with a Th-700R4 transmission must be pulled a fixed distance D of 1.610" to move the throttle valve plunger in the transmission from a starting point at idle to a fully buried position at wide open throttle.

The correct throttle cable pull distance may be implemented by providing a 75.180 (A°) cam having an arc length of 1.610" (D). The cam will have first R1 and second R2 radiuses of 1.227". Such a cam will have an arc length D of exactly 1.610", which is equal to the desired fixed pull distance. This design will provide 0.02142" of cable pull for each degree of throttle linkage member 504 rotation, ultimately pulling the throttle valve cable the required 1.610" (D) during the 75.180 (Al) of throttle linkage member 504 rotation from idle to wide open throttle. This design provides a constant steady pulling action throughout the entire throttle linkage member 504 rotation.

Figure 4:
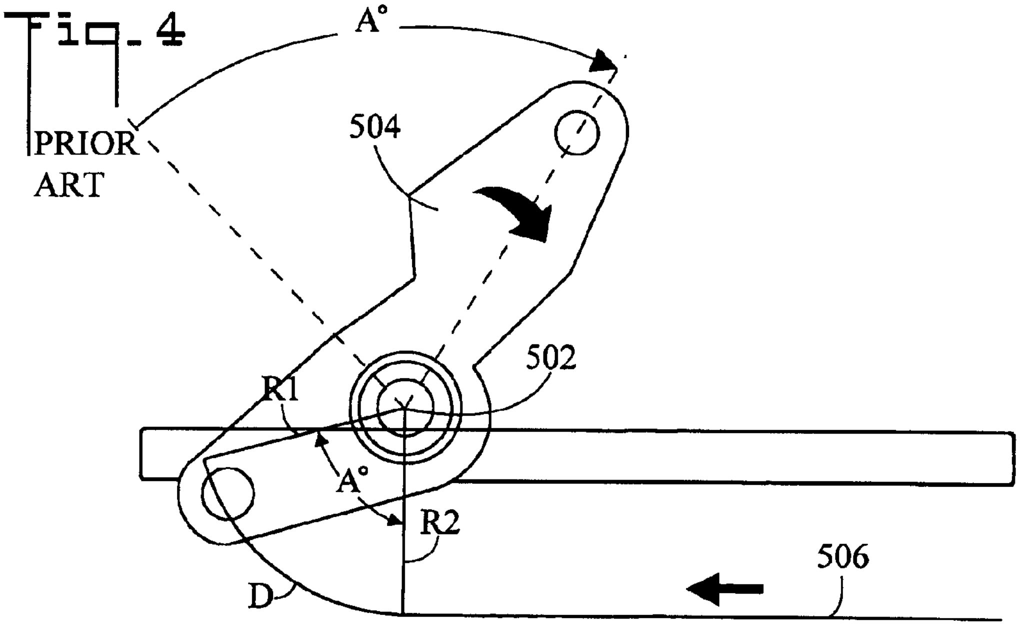
Fig. 4 PRIOR ART
FIG. 4 is a side elevation view of the throttle linkage member in a wide open throttle state showing the nominal arc of cam pull for a throttle valve cable.

FIG. 4 is a side elevation view of throttle linkage member 504 in a wide open throttle state showing the nominal arc of cam pull for a throttle valve cable 506. Throttle linkage member 504 has been rotated 75.180. This results in a throttle valve cable 506 pull of the desired 1.610" (D).

While the cam design depicted in FIGS. 3 and 4 provides the correct cable pull of 1.610", the transmission may not shift at the desired time during light and medium throttle driving. It may feel too soft or too firm or the downshift characteristics may be too aggressive or not aggressive enough. To provide a different rate of cable pull, the same cam can be positioned on the throttle linkage differently.

Figure 5:
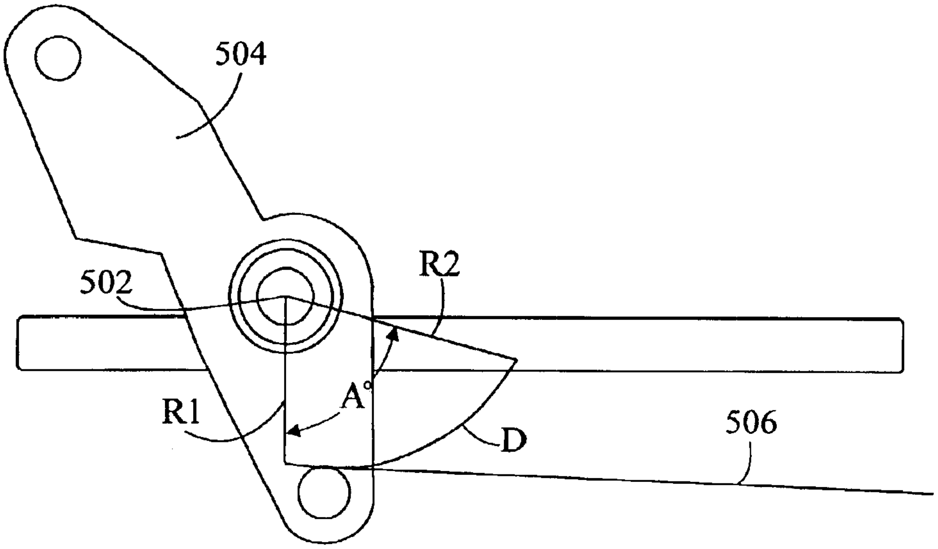
FIG. 5 is a side elevation view of the throttle linkage member in an idle state showing a passive arc of cam pull for a throttle valve cable.
Figure 6:
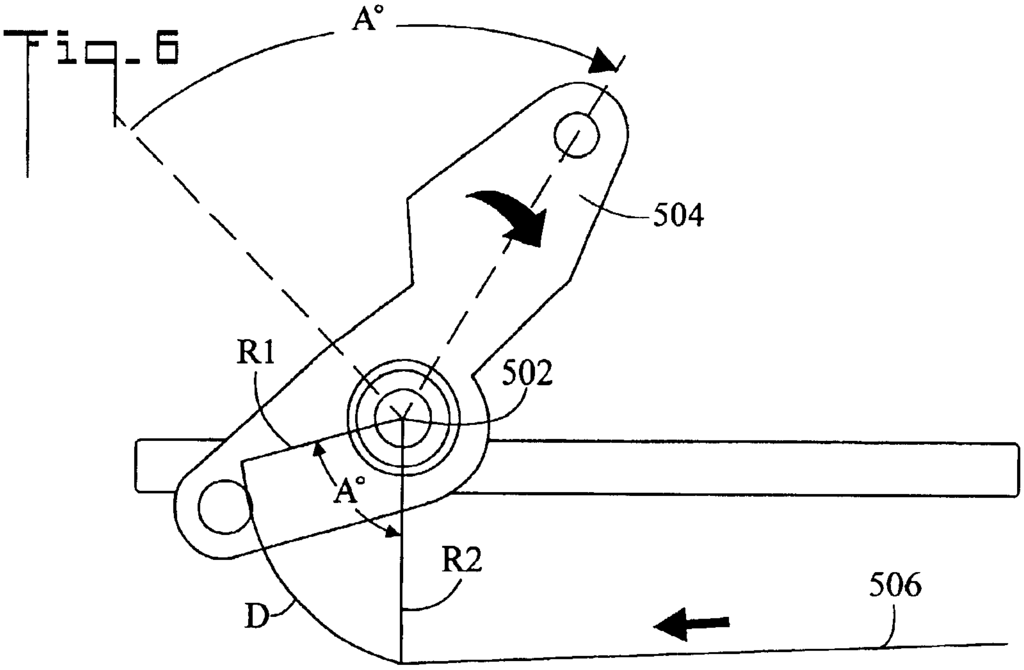
FIG. 6 is a side elevation view of the throttle linkage member in a wide open throttle state showing the passive arc of cam pull for a throttle valve cable.

FIGS. 5 and 6 are side elevation views of throttle linkage member 504 in idle and wide open throttle states, respectively, showing a passive arc of cam pull for throttle valve cable 506. The cam arc having a length of D inches (1.610") has been moved up along R1 and out along R2. In this position the end of the cam are furthest from the cable housing is positioned with a starting radius R1 of only 0.977" from the centerline of the throttle shaft 502. The other end of the cam arc is positioned with a starting radius R2 of 1.4113" from the centerline of the throttle shaft 502. The cam positioned in this manner will still pull the throttle valve cable 506 the required 1.610" while the throttle linkage is rotated 75.18° from idle to wide open throttle. However, the rate of throttle valve cable 506 pull will be slower at first due to the shorter R1 distance and more rapid at the end of the pull due to the longer R2 distance. The throttle valve cable 506 will be pulled only 0.0174" during the first degree of linkage rotation compared to 0.02142" of the constant rate cams in FIGS. 3 and 4. As the throttle is rotated towards wide open throttle, each successive degree will pull the cable a little greater distance. The final degree of throttle linkage rotation will pull the throttle valve cable 0.0246". Positioning the cam on the throttle linkage in this manner will cause the throttle valve cable to pull slowly at first but progressively more rapidly as the throttle is rotated towards wide open throttle. The transmission will shift noticeably quicker and softer with most accelerator pedal settings especially during light to medium accelerator pedal applications. The downshifting characteristics will be less aggressive requiring a greater application of throttle to perform downshifts. Wide open throttle performance will remain the same.

Figure 7:
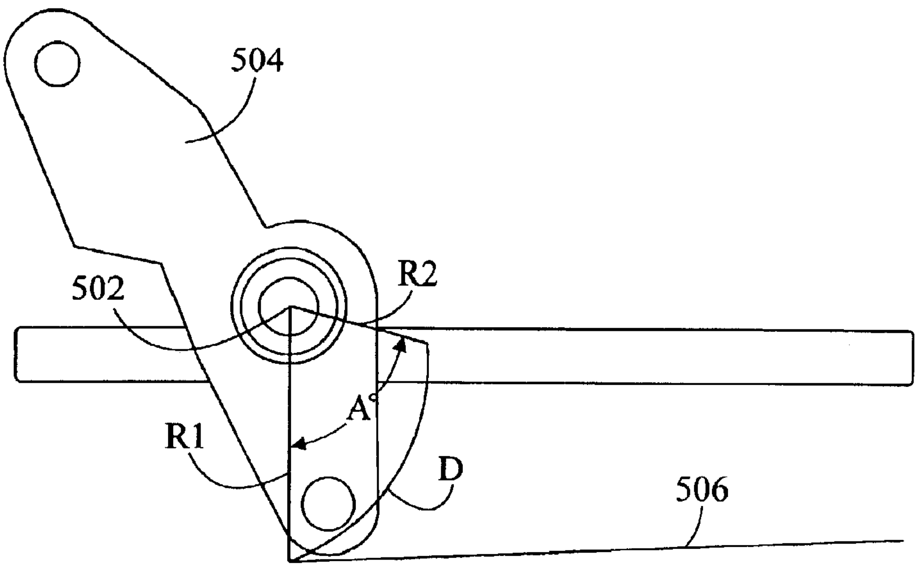
FIG. 7 is a side elevation view of the throttle linkage member in an idle state showing an aggressive arc of cam pull for a throttle valve cable.
Figure 8:
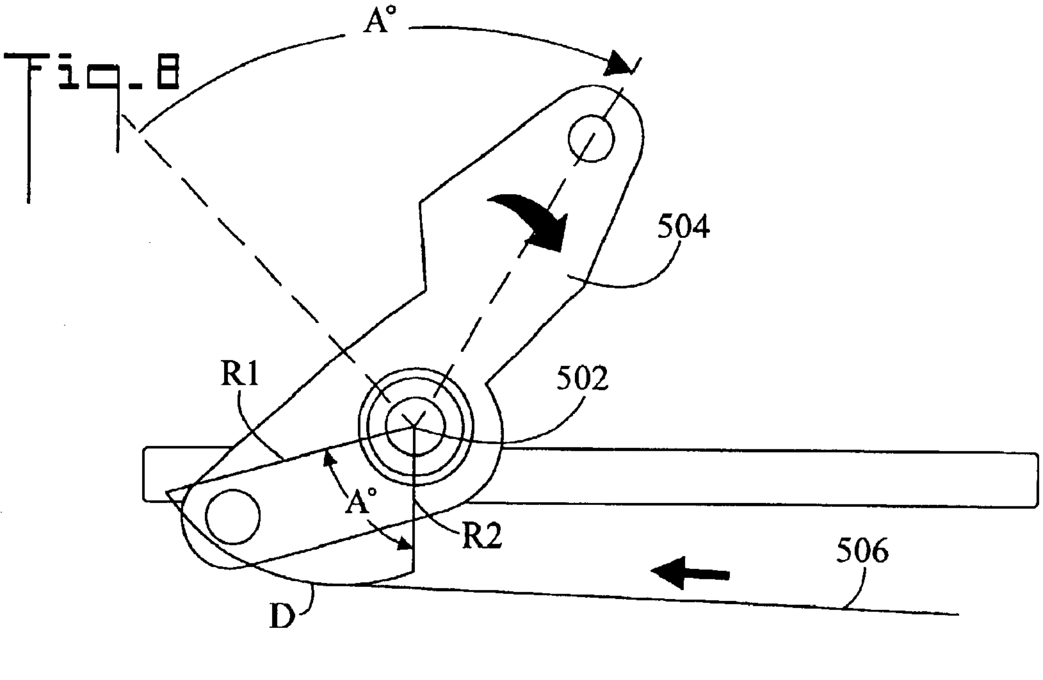
FIG. 8 is a side elevation view of the throttle linkage member in a wide open throttle state showing the aggressive arc of cam pull for a throttle valve cable.

FIGS. 7 and 8 are side elevation views of throttle linkage member 506 in idle and wide open throttle states, respectively, showing an aggressive arc of cam pull for throttle valve cable 506. The cam arc having a length of D (1.610") has been moved down along R1 and in along R2. In this position the end of the cam arc furthest from the cable housing is positioned with a starting radius R1 of 1.477" from the centerline of the throttle shaft 502. The other end of the cam arc is positioned with a starting radius R2 of 0.8273" from the centerline of the throttle shaft 502. The cam positioned in this manner will still pull the throttle valve cable 506 the required 1.610" while the throttle linkage is rotated 75.18° from idle to wide open throttle. However, the rate of throttle valve cable 506 pull will be faster at first due to the longer R1 distance and more slowly at the end of the pull due to the shorter R2 distance. The throttle valve cable 506 will be pulled 0.0257" during the first degree of linkage rotation compared to 0.02142" of the constant rate cams in FIGS. 3 and 4. As the throttle is rotated towards wide open throttle, each successive degree will pull the cable a little lesser distance. The final degree of throttle linkage rotation will pull the throttle valve cable 506 only 0.0165". Positioning the cam on the throttle linkage in this manner will cause the throttle valve cable 506 to pull rapidly at first but then progressively more slowly per degree of throttle rotation. The transmission will shift noticeably later and firmer with most light to medium throttle settings. Downshifting will be more active requiring less accelerator pedal to accomplish. Wide open throttle performance will remain the same.

Figure 9:
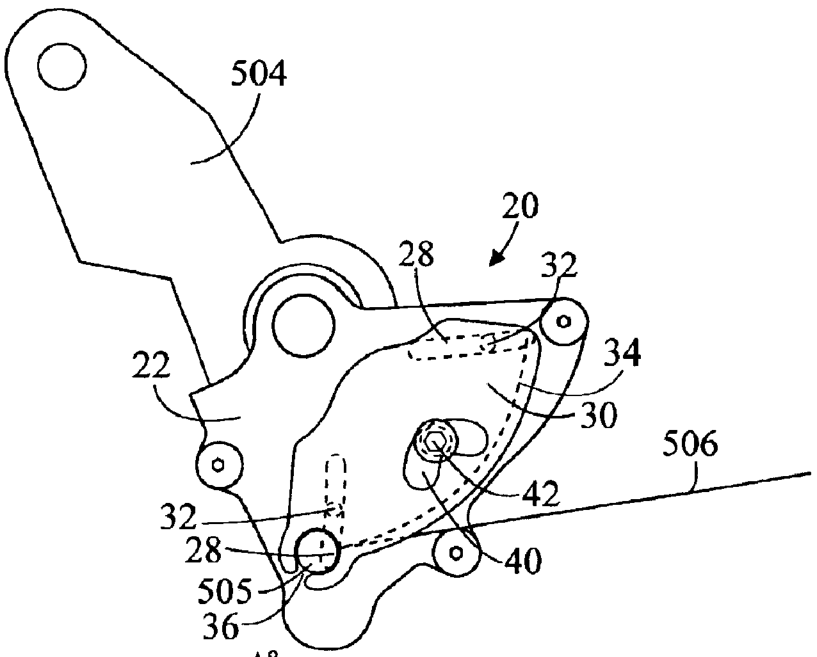
FIG. 9 is a side elevation view of a system for controlling an automatic transmission throttle valve in accordance with the present invention mounted on the throttle linkage member shown in an idle state.
Figure 10:
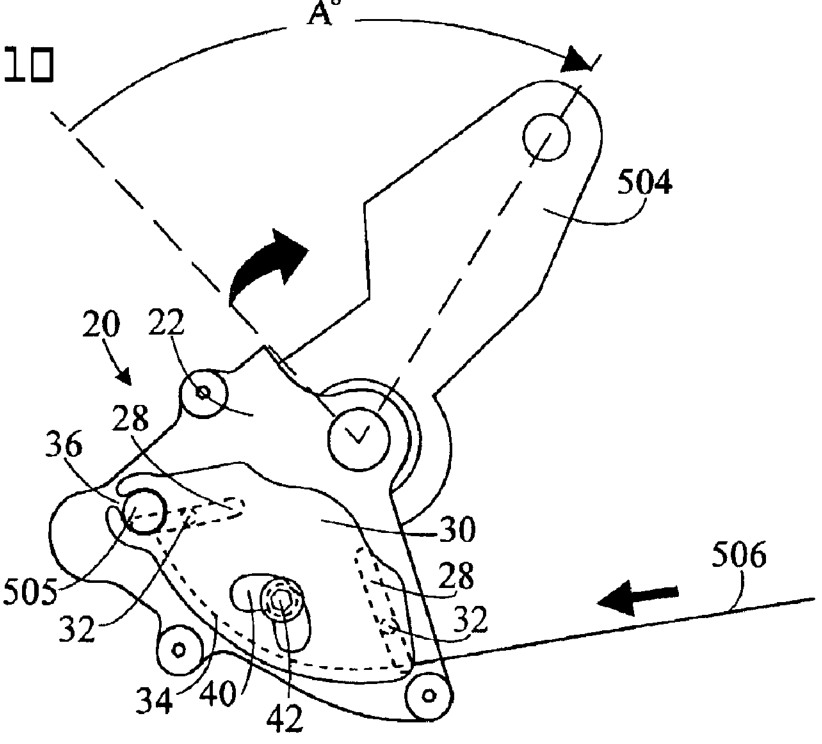
FIG. 10 is a side elevation view of the system and throttle linkage member of FIG. 9 rotated to the wide open throttle state.

FIGS. 9 and 10 are side elevation views of a system for controlling an automatic transmission throttle valve in accordance with the present invention, generally designated as 20, shown in an idle state and wide open throttle state, respectively. System 20 is mounted on the rotatable throttle member, which is throttle linkage member 504 in the shown embodiment. System 20 includes an adapter assembly 22 which is attachable to the throttle linkage member 504. Adapter assembly 22 has a pocket 24 (see FIGS. 20 and 22) for receiving throttle linkage member 504, so that adapter assembly 22 may be fixedly mounted on throttle linkage member 504 and rotated thereby. Adapter assembly 22 also has a hole 26 for accepting throttle shaft 502 (see FIGS. 19 and 22).

A cam assembly 30 is slidably mounted on adapter assembly 22. Cam assembly 30 has a throttle valve cable guide 34 which receives throttle valve cable 506, a receptacle or holder 36 for holding the bulbous end 505 of throttle valve cable 506 (see FIGS. 15–17), and at least one guide pin 32. In the shown embodiment, cam assembly has two guide pins 32.

Figure 19:
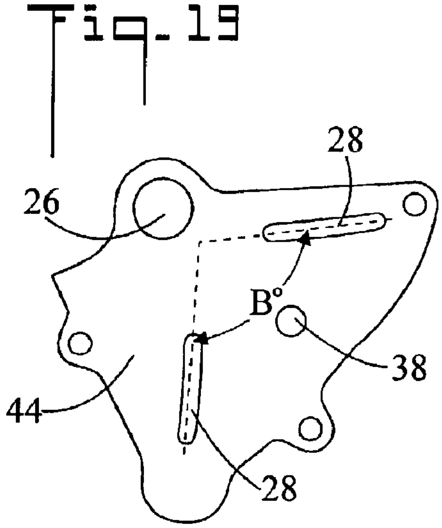
FIG. 19 is a side elevation view of a front plate.
Figure 22:
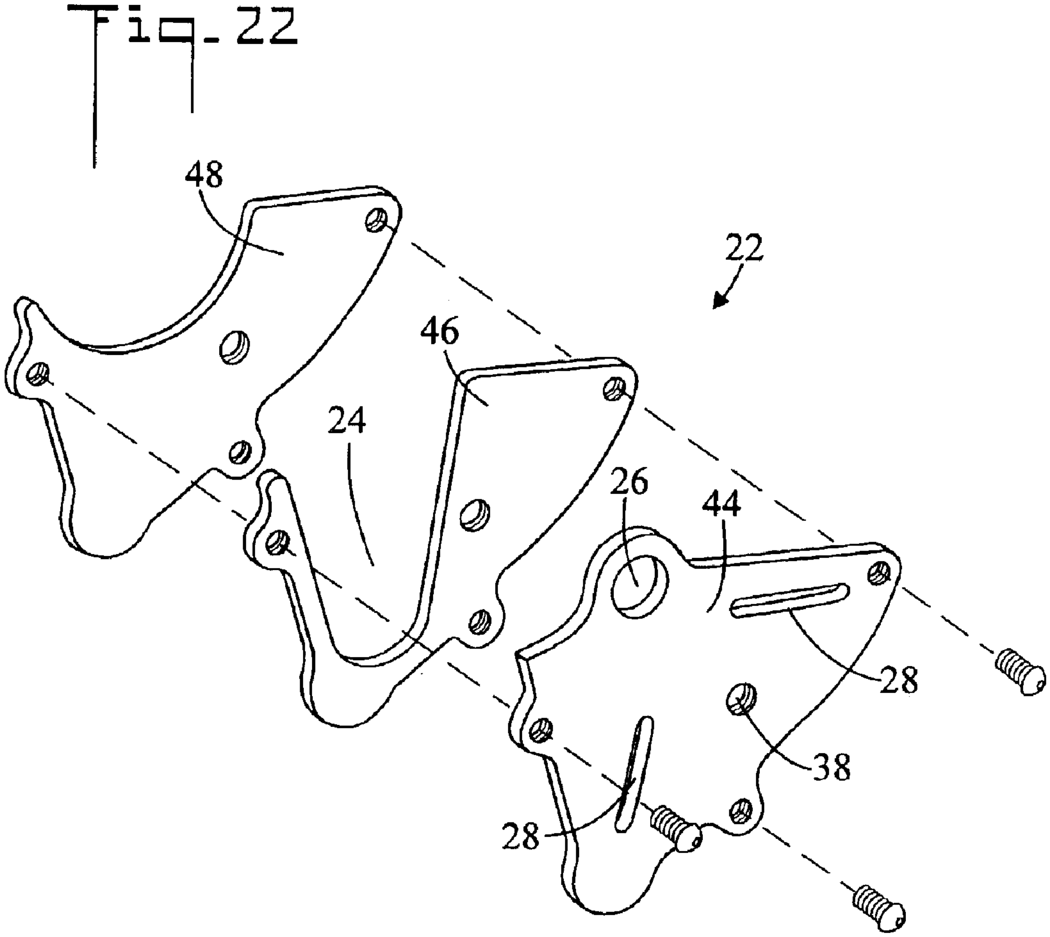
FIG. 22 is an exploded perspective view showing how the front plate, pocket plate, and rear plate fit together to form an adapter assembly.

Adapter assembly 22 has at least one guide slot 28 (refer also to FIGS. 19 and 22). In the shown embodiment, adapter assembly 22 has two slightly curved guide slots which form an angle B° of between 75° and 1050 with respect to each other. One guide pin 32 of cam assembly 30 is slidably received by each of the guide slots 28. The guide pins and guide slots limit the range of motion of the cam assembly with respect to adapter assembly 22.

A retaining mechanism selectively locks cam assembly 30 in a fixed relationship to adapter assembly 22. The retaining mechanism includes adapter assembly 22 having a threaded hole 38 (see FIGS. 19–22), cam assembly 30 having a curved adjustment slot 40, and an adjustment screw 42. Adjustment screw 42 passes through adjustment slot 40 and engages threaded hole 38 so that when adjustment screw 42 is tightened, cam assembly 30 and adapter assembly 22 are forced together locking the cam assembly at a particular location with respect to the adapter assembly.

Two guide slots 28 substantially perpendicular to each other and two guide pins 32 are preferred over one slot and one guide pin to hold the cam assembly 30 to the adapter assembly 22. At least one pin will then always be against the side of a slot to prohibit movement of the cam assembly 30 with respect to the adapter assembly 22 in most directions. This makes the cam assembly better able to resist forces applied in most directions which might otherwise cause it to become loose.

The position of cam assembly 30 with respect to adapter assembly 22 determines the desired shift timing, firmness, and feel. In FIG. 9, throttle linkage member 504 is in the idle position. Cam assembly 30 is rotated so that adjustment screw 42 assumes a mid position along adjustment slot 40, and then adjustment screw 42 is tightened locking cam assembly 30 in place on adapter assembly 22. In FIG. 10, throttle linkage member 504 has been rotated to a wide open throttle position, thereby pulling throttle valve cable 506 the desired distance. This mid position of cam assembly 30 on adapter assembly 22 will result in a constant steady pulling action throughout the entire throttle linkage member 504 rotation, as was depicted in FIGS. 3 and 4.

Figure 11:
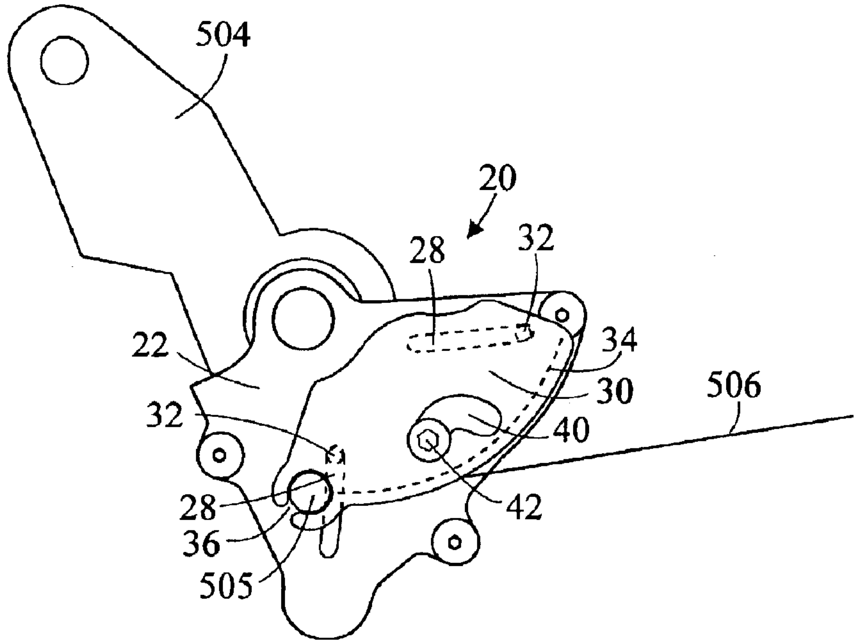
FIG. 11 is a side elevation view of the system for controlling an automatic transmission throttle valve with the system set to a passive position.
Figure 12:
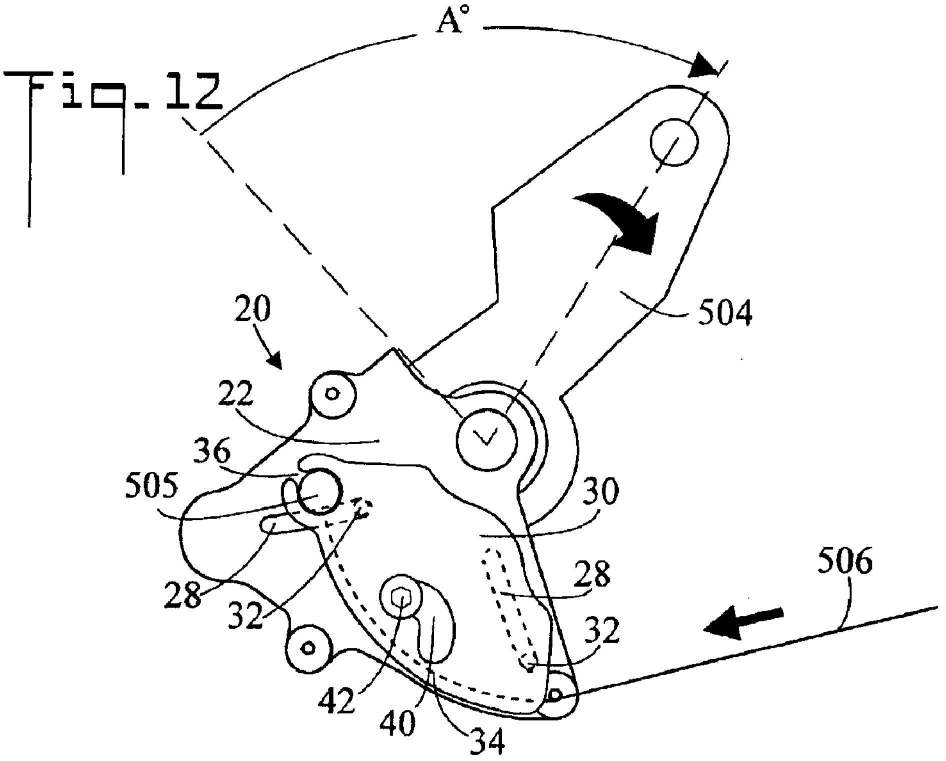
FIG. 12 is a side elevation view of the system and throttle linkage member of FIG. 11 rotated to the wide open throttle state.

FIGS. 11 and 12 are side elevation views at idle and wide open throttle, respectively, of system 20 set to a passive throttle valve position. Cam assembly 30 has been positioned on adapter assembly 22 so that the left and right guide pins 32 have been moved to their extreme up and right positions respectively, and adjustment screw 42 has been moved to the leftmost position along adjustment slot 40. Adjustment screw 42 has been tightened to lock cam assembly 30 in place along guide slot 40 on adapter assembly 22. This position of cam assembly 30 results in the passive throttle valve cable 506 pull previously described in the discussion of FIGS. 5 and 6.

Figure 13:
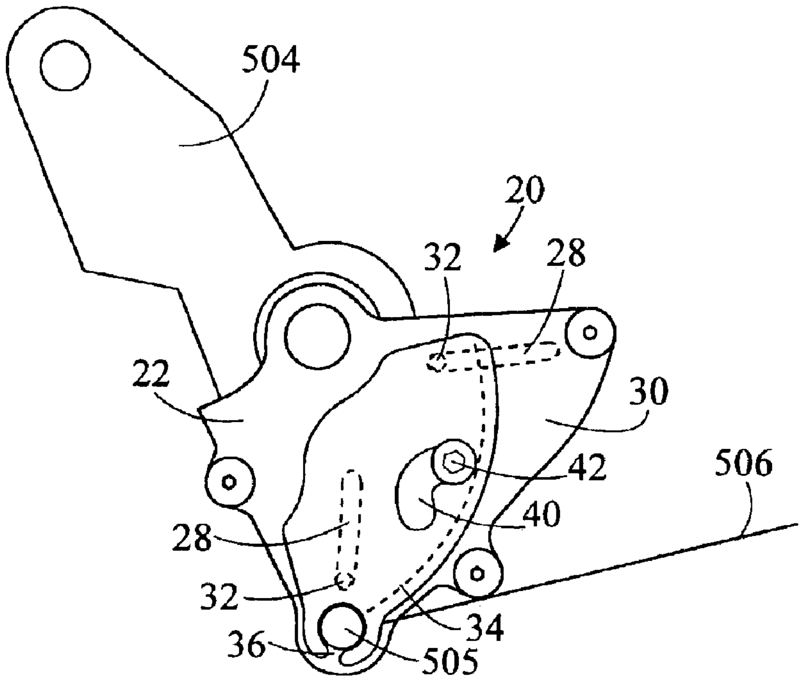
FIG. 13 is a side elevation view of the system for controlling an automatic transmission throttle valve with the system set to an aggressive position.
Figure 14:
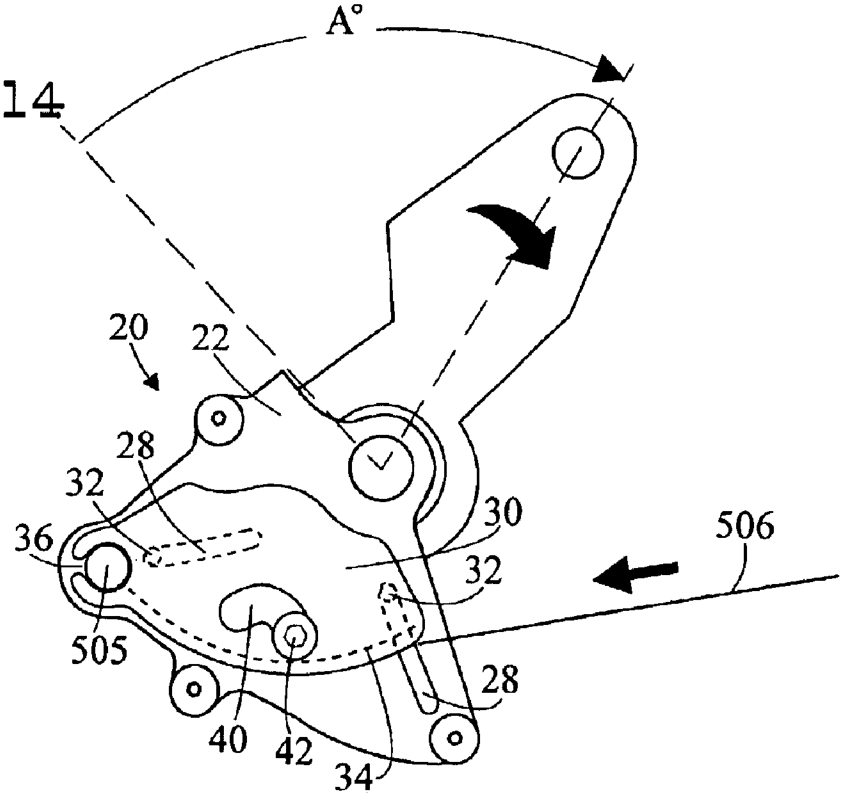
FIG. 14 is a side elevation view of the system and throttle linkage member of FIG. 13 rotated to the wide open throttle state.

FIGS. 13 and 14 are side elevation views at idle and wide open throttle, respectively, of system 20 set to an active throttle valve position. Cam assembly 30 has been positioned on adapter assembly 22 so that the left and right guide pins 32 have been moved to their extreme down and left positions, respectively, and adjustment screw 42 has been moved to the rightmost position along adjustment slot 40. Adjustment screw 42 has been tightened to lock cam assembly 30 in place along guide slot 40 on adapter assembly 22. This position of cam assembly 30 results in the aggressive throttle valve cable 506 pull previously described in the discussion of FIGS. 7 and 8.

Figure 15:
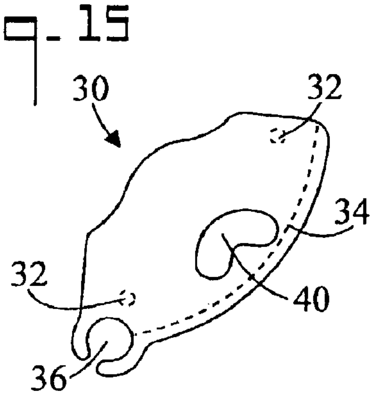
FIG. 15 is a side elevation view of a cam assembly.
Figure 16:
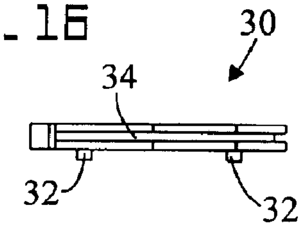
FIG. 16 is a edge view of the cam assembly.
Figure 17:
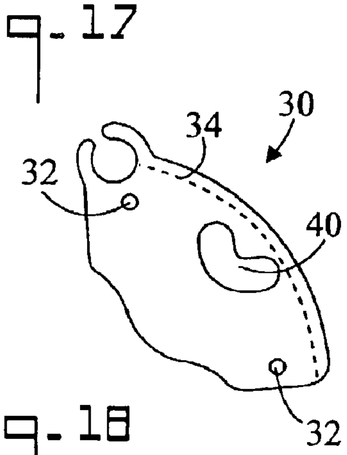
FIG. 17 is an opposite side elevation view of the cam assembly.

FIGS. 15–17 are side elevation, edge, and opposite side elevation views, respectively, of cam assembly 30, showing guide pins 32, throttle valve cable guide 34, holder 36, and adjustment slot 40.

Figure 18:
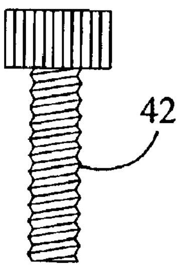
FIG. 18 is an enlarged side elevation view of an adjustment screw.

FIG. 18 is an enlarged side elevation view of adjustment screw 42.

FIG. 19 is a side elevation view of a front plate 44 of adapter assembly 22. Front plate 44 includes guide slots 28, and threaded hole 38 which receives adjustment screw 42. Angle B is between about 750 and 105°.

Figure 20:
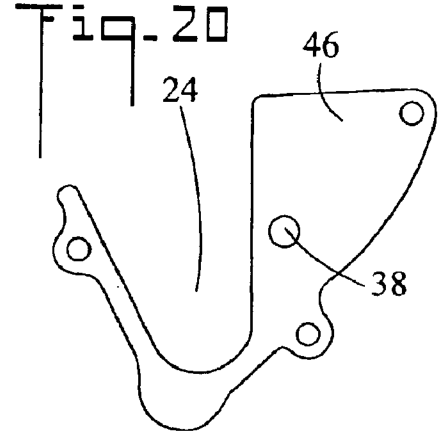
FIG. 20 is a side elevation view of a pocket plate.

FIG. 20 is a side elevation view of a pocket plate 46 of adapter assembly 22. Pocket plate 46 has a contoured pocket 24 for receiving at least a portion of throttle linkage member 504 (rotatable throttle member).

Figure 21:
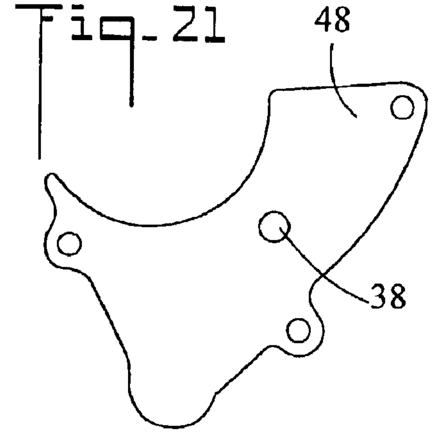
FIG. 21 is a side elevation view of a rear plate.

FIG. 21 is a side elevation view of a rear plate 48 of adapter assembly 22.

When front plate 44, pocket plate 46, and rear plate 48 are bolted together, they form a "sandwich" around throttle linkage member 504 and are rigidly held thereto.

FIG. 22 is an exploded perspective view showing how the front plate 44, pocket plate 46, and rear plate 48 fit together to form adapter assembly 22.

Figure 23:
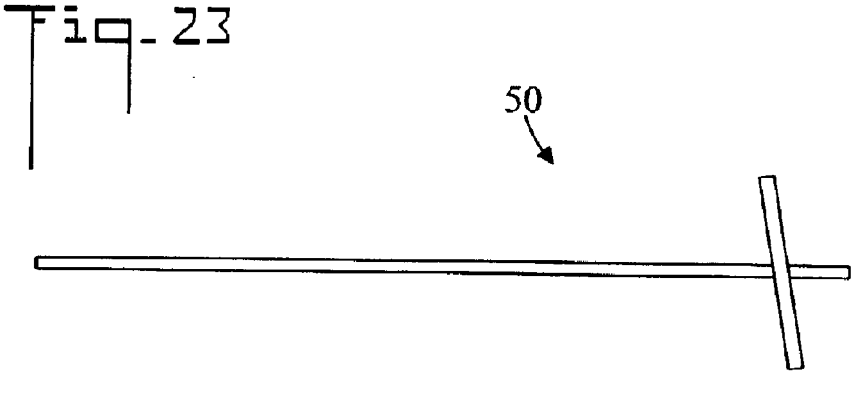
FIG. 23 is a side elevation view of a throttle valve cable mounting bracket.

FIG. 23 is a side elevation view of a throttle valve cable mounting bracket 50. Throttle valve cable mounting bracket 50 holds throttle valve cable housing 507, and is mountable beneath fuel management device 500 (usually between fuel management device 500 and intake manifold 508), (refer also to FIG. 24).

Figure 24:
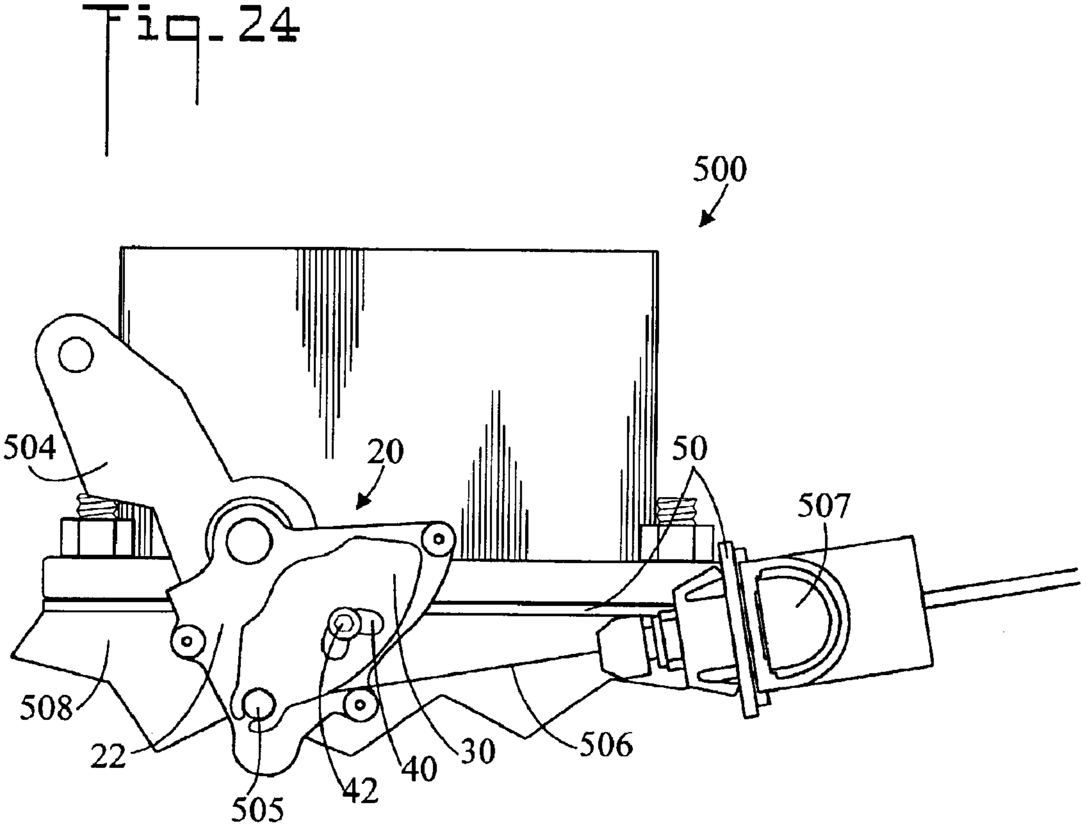
FIG. 24 is a side elevation view of the system mounted on the fuel management device.

FIG. 24 is a side elevation view of system 20 mounted on fuel management device 500. Throttle valve cable housing 507 has an adjustment feature which permits longitudinal movement as described in U.S. Pat. No. 5,295,408.

Figure 25:
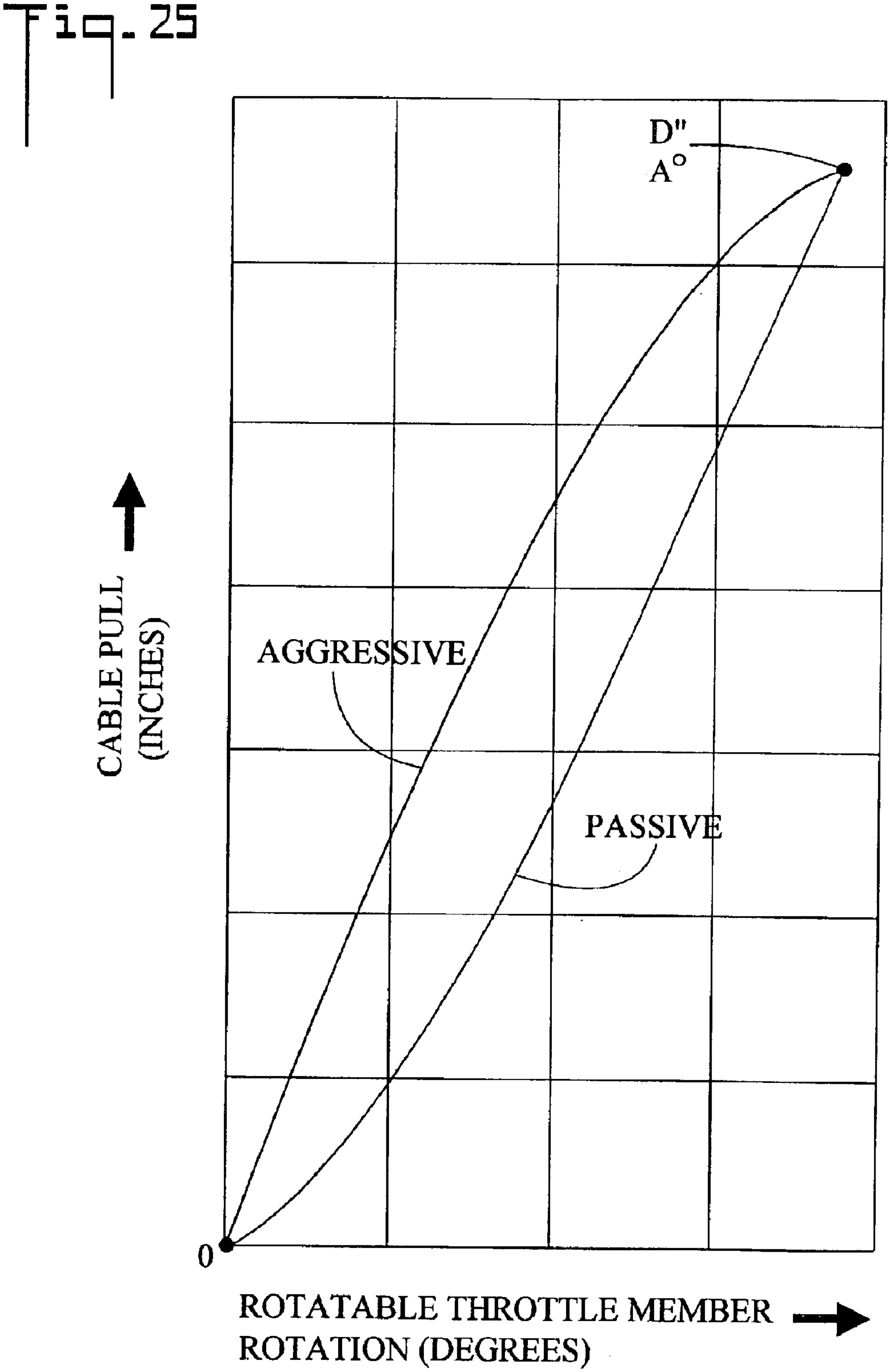
FIG. 25 is a graph showing cable pull distance in relation to rotatable throttle member rotation for both passive and aggressive throttle valve responses.

FIG. 25 is a graph showing cable pull distance D" in relation to rotatable throttle member rotation A° for both passive and aggressive throttle valve responses. The passive connection shown in FIGS. 11 and 12 results in a lesser cable pull response at the start of rotatable throttle member rotation. Conversely, the aggressive connection shown in FIGS. 13 and 14 results in a greater cable pull response at the start of rotatable throttle member rotation. This difference in the rate of cable pull causes the transmission throttle valve to change the performance characteristics of the transmission.

Figure 26:
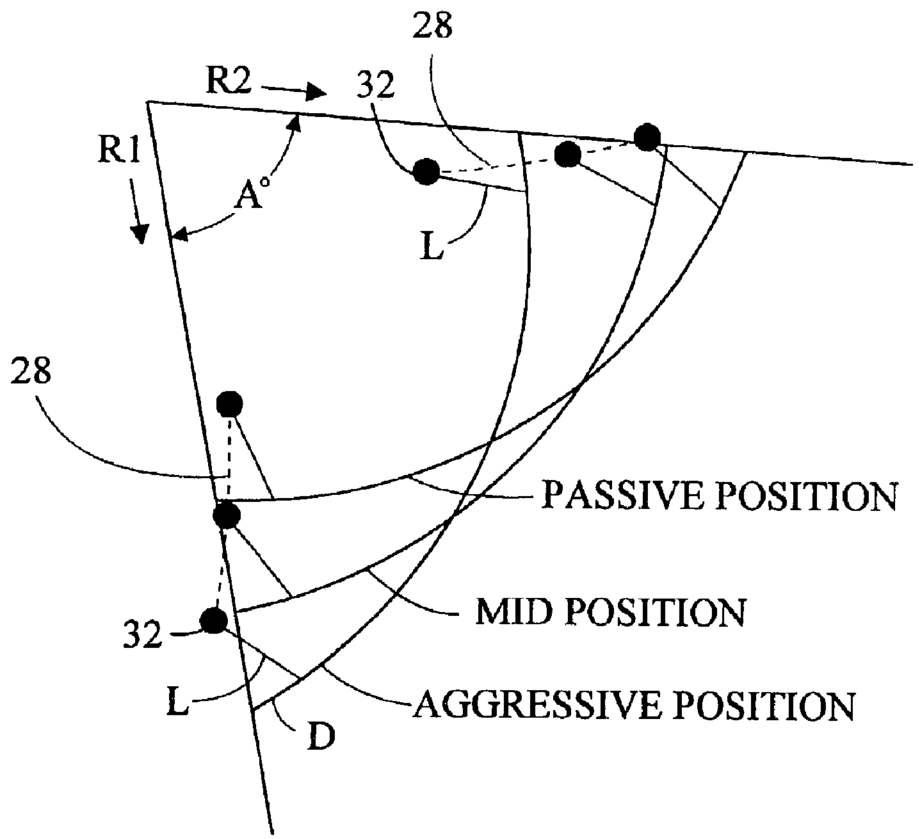
FIG. 26 is a graph showing the calculation of guide slots.

FIG. 26 is a graph showing one method of determining guide slot 28 position and shape. Two lines along which cam radiuses R1 and R2 are measured define rotation angle A. Starting at the aggressive position, one end of cam arc length D is placed at radius R1 and the other end of cam arc length D is placed at radius R2. The position of guide pin 32 with respect to cam arc length D is defined by line L. The R1 end of cam arc length D is then progressively moved up along radius R1 and cam arc length D rotated so that the other end of cam arc length D touches radius R2. The upward movement is continued until cam arc length D reaches the R1 and R2 values which correspond to the passive position. As the upward movement is made, the progressive positions of guide pins 32 (dots) are mapped onto front plate 44 of adapter assembly 22, thereby resulting in guide slots 28 (dashed line). It may be appreciated that the principles of trigonometry could also be used to calculate the position of guide slots 28.

It is noted that the above cited technique is generic in nature, and can be utilized to calculate the guide slot 28 position for any fuel manage device and associated transmission throttle valve, depending upon the particular parameters of these devices.

Figure 27:
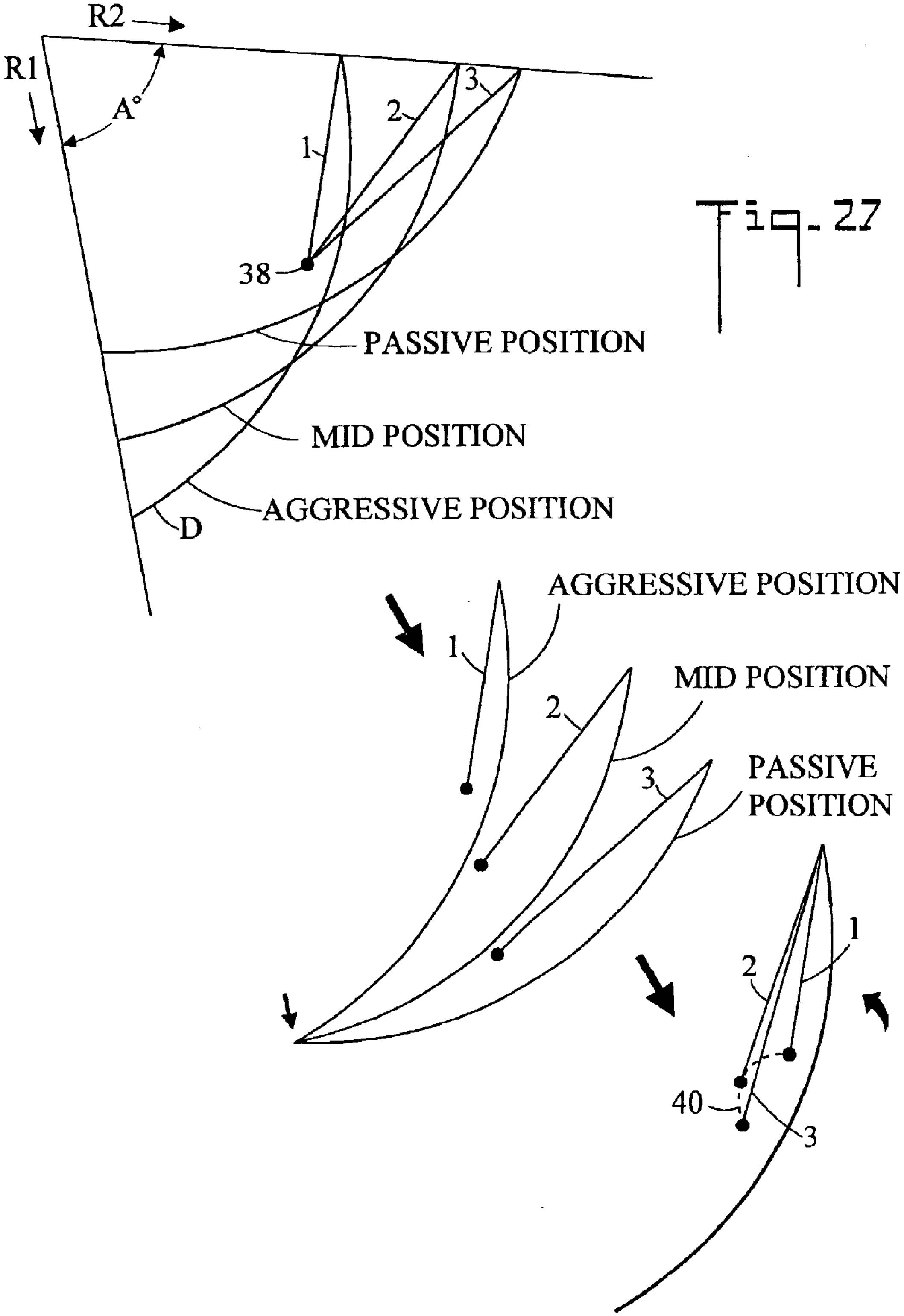
FIG. 27 is a graph showing the calculation of an adjustment slot.

FIG. 27 is a graph showing the calculation of adjustment slot 40 position and shape. The positions of cam arc length D are as illustrated in FIG. 26 above. The relative position of threaded hold 38 on front plate 44 of adapter assembly 22 with respect to each cam arc length D position is indicated by lines 1, 2 and 3. The three cam arc length D positions are then superimposed to result in adjustment slot 40. Again, trigonometry could be used to perform this calculation.

In terms of use, a method for controlling a transmission throttle valve, includes:

(a) providing a vehicle having a fuel management device 500 which includes a rotatable throttle member 504 having an idle state and a wide open throttle state;

(b) providing a transmission throttle valve connected to a throttle valve cable 506;

(c) providing a system 20 for controlling the transmission throttle valve, including:

- a cam assembly 30 attachable to rotatable throttle member 504;
- transmission throttle valve cable 506 connectable to cam assembly 30, wherein when rotatable throttle member 504 is rotated from the idle state to the wide open throttle state, cam assembly 30 pulls transmission throttle valve cable 506 a fixed distance;
- cam assembly 30 selectively positionable with respect to rotatable throttle member 504, wherein the position of cam assembly 30 determines the rate at which throttle valve cable 506 is pulled; and,
- a retaining mechanism for locking cam assembly 30 in a fixed position with respect to said rotatable throttle member 504;

(d) positioning cam assembly 30 to a desired position with respect to rotatable throttle member 504;

(e) using the retaining mechanism to lock cam assembly 30 in the desired position;

(f) attaching transmission valve throttle cable 506 to cam assembly 30;

(g) causing rotatable throttle member 504 to rotate from the idle state to the wide open throttle state; and, (h) observing that cam assembly 30 pulls throttle valve cable 506 the fixed distance.

The method further including:

in step (h), cam assembly 30 pulling throttle valve cable 506 the fixed distance for any selected position of cam assembly 30 with respect to rotatable throttle member 504 in step (d).

The preferred embodiments of the invention described herein are exemplary and numerous modifications, dimensional variations, and rearrangements can be readily envisioned to achieve an equivalent result, all of which are intended to be embraced within the scope of the appended claims.

I claim:

1. A system for controlling a transmission throttle valve in a vehicle having a fuel management device which includes a rotatable throttle member having an idle state and a wide open throttle state, the transmission throttle valve connected to a transmission throttle valve cable, said system comprising:

a cam assembly attachable to the rotatable throttle member;

the transmission throttle valve cable connectable to said cam assembly, wherein when the rotatable throttle member is rotated from the idle state to the wide open throttle state, said cam assembly pulls the transmission throttle valve cable a correct cable pull distance;

said cam assembly selectively positionable on the rotatable throttle member, wherein the position of said cam assembly determines a rate at which the transmission throttle valve cable is pulled said correct cable pull distance; and, wherein as the transmission throttle valve cable is pulled said correct cable pull distance said rate being one of (1) increasing as the rotatable throttle member is rotated from the idle state to the wide open throttle state, and (2) decreasing as the rotatable throttle member is rotated from the idle state to the wide open throttle state.

2. A system according to claim 1, further including:

as the rotatable throttle member is rotated from the idle state to the wide open throttle state, said cam assembly pulling the transmission throttle valve cable said correct cable pull distance for any selected position of said cam assembly on the rotatable throttle member.

3. A system for controlling a transmission throttle valve in a vehicle having a fuel management device which includes a rotatable throttle member having an idle state and a wide open throttle state, the transmission throttle valve connected to a transmission throttle valve cable, said system comprising:

an adapter assembly attachable to the rotatable throttle member;

said adapter assembly including at least one guide slot;

a cam assembly having at least one guide pin, a throttle valve cable guide, and a holder for holding the throttle valve cable;

a retaining mechanism for selectively locking said adapter assembly and said cam assembly in fixed relationship;

wherein said cam assembly may be placed in contact with said adapter assembly so that said at least one guide pin is received by said at least one guide slot; and, wherein said cam assembly may be moved so that said at least one guide pin assumes a desired position along said at least one guide slot, and said cam assembly locked in said desired position with said retaining mechanism; and, the transmission throttle valve cable connectable to said cam assembly, wherein when the rotatable throttle member is rotated from the idle state to the wide open throttle state, said cam assembly pulls the transmission throttle valve cable a correct cable pull distance for any selected position of said cam assembly with respect to said adapter assembly, and, wherein said locked desired position of said cam assembly determines a rate at which said transmission throttle valve cable is pulled said correct cable pull distance as the rotatable throttle member is rotated from the idle state to the wide open throttle state.

4. A system according to claim 3, further including:

said at least one guide slot being curved.

5. A system according to claim 3, further including:

a throttle valve cable mounting bracket for holding the throttle valve cable; and, said throttle valve cable mounting bracket mountable beneath the fuel management system.

6. A system according to claim 3, further including:

said retaining mechanism including:

said adapter assembly including a threaded hole;

said cam assembly having an adjustment slot;

an adjustment screw which threadably engages said threaded hole in said adapter assembly;

wherein said adjustment screw passes through said adjustment slot and engages said threaded hole, so that when said adjustment screw is tightened, said cam assembly and said adapter assembly are forced together;

said adjustment slot being curved;

said adapter assembly having a pocket for receiving the rotatable throttle member, so that said adapter assembly may be mounted on the rotatable throttle member;

said adapter assembly including two said guide slots;

said cam assembly including two said guide pins, wherein one said guide pin is received by each of said guide slots; and, said two guide slots being curved.

7. A system according to claim 3, further including:

wherein as the transmission throttle valve cable is pulled said correct cable pull distance said rate being one of (1) increasing as the rotatable throttle member is rotated from the idle state to the wide open throttle state, and (2) decreasing as the rotatable throttle member is rotated from the idle state to the wide open throttle state.

8. A system according to claim 3, further including:

said retaining mechanism including:

said adapter assembly including a threaded hole;

said cam assembly having an adjustment slot;

an adjustment screw which threadably engages said threaded hole in said adapter assembly; and, wherein said adjustment screw passes through said adjustment slot and engages said threaded hole, so that when said adjustment screw is tightened, said cam assembly and said adapter assembly are forced together.

9. A system according to claim 8, further including:

said adjustment slot being curved.

10. A system according to claim 3, said system further including:

said adapter assembly having a pocket for receiving the rotatable throttle member, so that said adapter assembly may be mounted on the rotatable throttle member.

11. A system according to claim 10, further including:

said adapter assembly including a front plate having said threaded hole and said at least one guide slot, a pocket plate contoured to at least a portion of the rotatable throttle member, and a rear plate.

12. A system according to claim 3, further including:

said adapter assembly including two said guide slots; and, said cam assembly including two said guide pins, wherein one said guide pin is received by each of said guide slots.

13. A system according to claim 12, further including:

said two guide slots forming an angle of between about 75° and 105°.

14. A method for controlling a transmission throttle valve, comprising:

(a) providing a fuel management device which includes a rotatable throttle member having an idle state and a wide open throttle state, (b) providing a transmission throttle valve connected to a transmission throttle valve cable;

(c) providing a system for controlling said transmission throttle valve, including:

a cam assembly attachable to said rotatable throttle member, said transmission throttle valve cable connectable to said cam assembly, wherein when said rotatable throttle member is rotated from said idle state to said wide open throttle state, said cam assembly pulls said transmission throttle valve cable a correct cable pull distance;

said cam assembly selectively positionable with respect to said rotatable throttle member, wherein the position of said cam assembly determines a rate at which said throttle valve cable is pulled, said rate being one of (I) increasing as said rotatable throttle member is rotated from said idle state to said wide open throttle state, and (2) decreasing as said rotatable throttle member is rotated from said idle state to said wide open throttle state, and, a retaining mechanism for locking said cam assembly in a fixed position with respect to said rotatable throttle member;

(d) position said cam assembly to a desired position with respect to said rotatable throttle member;

(e) using said retaining mechanism to lock said cam assembly in said desired position;

(f) attaching said transmission valve throttle cable to said cam assembly; and, (g) causing said rotatable throttle member to rotate from said idle state to said wide open throttle state thereby pulling said transmission throttle valve cable said correct cable pull distance: and, (h) observing that said rate at which said transmission throttle valve cable is pulled said correct cable pull distance results in a desired transmission shift timing, firmness, and feel.

15. A system according to claim 14, further including:

(i) observing that said cam assembly pulls said transmission throttle valve cable said correct cable pull distance for any selected position of said cam assembly with respect to said rotatable throttle member in step (d).

* * * * *